United States Patent
Ewington et al.

(10) Patent No.: US 10,185,620 B2
(45) Date of Patent: Jan. 22, 2019

(54) AUTOMATED TELLER MACHINE ("ATM") SOFTWARE RECOVERY

(71) Applicant: Bank of America Corporation, Charlotte, NC (US)

(72) Inventors: Craig Ewington, Charlotte, NC (US); Debashis Choudhury, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 221 days.

(21) Appl. No.: 15/264,459

(22) Filed: Sep. 13, 2016

(65) Prior Publication Data
US 2018/0074886 A1 Mar. 15, 2018

(51) Int. Cl.
*G06F 11/00* (2006.01)
*G06F 11/07* (2006.01)
(Continued)

(52) U.S. Cl.
CPC ........... *G06F 11/0793* (2013.01); *G06F 8/65* (2013.01); *G06F 11/079* (2013.01); *G06F 11/0709* (2013.01); *G06F 11/0736* (2013.01); *G06F 11/0757* (2013.01); *G06F 11/1417* (2013.01); *G06F 11/302* (2013.01); *G06F 11/3006* (2013.01); *G06F 11/3013* (2013.01); *G06F 11/3055* (2013.01); *G06F 11/3476* (2013.01);
(Continued)

(58) Field of Classification Search
CPC ............. G06F 11/0709; G06F 11/0736; G06F 11/0757; G06F 11/0793; G06F 11/1417; G06F 11/1433; G06F 11/1438; G06F 11/3013; G06F 11/302; G06F 11/3055; G06F 11/3476
See application file for complete search history.

(56) References Cited

U.S. PATENT DOCUMENTS 8,387,037 B2* 2/2013 Henseler .................. G06F 8/63
717/168
9,092,296 B1* 7/2015 Nay ......................... G06F 8/654
(Continued)

OTHER PUBLICATIONS

"Booting Windows PE," https://technet.microsoft.com/en-us/library/cc709626(v=ws.10).aspx, Microsoft, Retrieved on Aug. 2, 2016.
(Continued)

*Primary Examiner* — Elmira Mehrmanesh
(74) *Attorney, Agent, or Firm* — Weiss & Arons LLP; Michael A. Springs, Esq.

(57) ABSTRACT

Aspects of the disclosure relate to an ATM internal self-repair recovery system. The system may be included in software updates transmitted to the ATM. The system may include an XML file and a log file. Prior to execution of each instruction included in the XML file, the system may write an intelligent log statement to the log file. A standalone web service may monitor the log file to determine new entries to the log file. When a new entry is the last entry for more than a predetermined amount of time, a midstream ATM stall may be determined. The system may compare the new entry to an ATM stall action table. The comparison may determine an appropriate action to repair the installation process based on the table. The ATM may perform the appropriate action and thereby recover from the failures that occurred during the update process.

17 Claims, 16 Drawing Sheets

(51) Int. Cl.
*G07F 19/00* (2006.01)
*G06F 8/65* (2018.01)
*G06F 11/14* (2006.01)
*G06F 11/30* (2006.01)
*G06F 11/34* (2006.01)
*G06F 9/4401* (2018.01)

(52) U.S. Cl.
CPC .......... *G07F 19/206* (2013.01); *G06F 9/4401* (2013.01); *G06F 2201/805* (2013.01); *G06F 2201/835* (2013.01); *G06F 2201/865* (2013.01)

(56) References Cited

U.S. PATENT DOCUMENTS

| | | | | |
|---|---|---|---|---|
| 9,176,728 B1* | 11/2015 | Dixit | ........................ | G06F 8/71 |
| 2006/0010435 A1* | 1/2006 | Jhanwar | .................... | G06F 8/65 |
| | | | | 717/168 |
| 2009/0307763 A1* | 12/2009 | Rawlins | .............. | G06F 9/44505 |
| | | | | 726/5 |
| 2011/0113418 A1* | 5/2011 | McCurdy | ................ | G06F 8/658 |
| | | | | 717/170 |
| 2011/0113422 A1* | 5/2011 | Ewington | ............... | G06F 8/658 |
| | | | | 717/176 |
| 2011/0113424 A1* | 5/2011 | Ewington | ............... | G06F 8/658 |
| | | | | 717/178 |
| 2011/0225577 A1* | 9/2011 | Wookey | .................. | G06F 8/658 |
| | | | | 717/175 |

OTHER PUBLICATIONS

"Device Controller," Wikimedia Foundation, Inc., Jan. 21, 2016.
"Techopedia—Device Management Software," https://www.techopedia.com/definition/24763/device-management-software, Retrieved on Aug. 10, 2016.
"Is There a Command to Restart Computer in Safe Mode?" Stack Overflow, New York, Oct. 2, 2012.
"Operating System," Wikimedia Foundation, Inc., Aug. 8, 2016.
"Regular Expression," Wikimedia Foundation, Inc., Jul. 25, 2016.
"Windows Preinstallation Environment," Wikimedia Foundation, Inc., May 31, 2016.

* cited by examiner

XML File:

902

<Write "The Activity will be accomplished" to Log File>
<Execute Step 1>
<Write "ABC123" to Log File>
<Execute Step 2>
<Write "gkdjoaij3356452" to Log File>
<Execute Step 3>
<Write "Bob will complete Step 4" to Log File>
<Execute Step 4>
<Write "Hardware element 634dkj3 will complete Step 5" to Log File>
<Execute Step 5>

FIG. 9

```xml
<?xml version="1.0"?>
<sequence version="3.00" name="Custom Task Sequence" description="Sample Custom Task Sequence">
<group expand="false" name="Initialize Environment" description="" disable="false" continueOnError="false">
<action />
<step type="SMS_TaskSequence_RunCommandLineAction" name="Start Imaging" description="Log file created to log reimage time and date. " disable="false" continueOnError="false" startIn="c:\StagingScripts\BAC_Scripts" successCodeList="0 3010" runIn="WinPEandFullOS">
<defaultVarList>
<variable name="PackageID" property="PackageID"></variable>
<variable name="RunAsUser" property="RunAsUser">false</variable>
<variable name="SMSTSRunCommandLineUserName" property="SMSTSRunCommandLineUserName"></variable>
<variable name="SMSTSRunCommandLineUserPassword" property="SMSTSRunCommandLineUserPassword"></variable>
<variable name="LoadProfile" property="LoadProfile">false</variable>
</defaultVarList>
<action>wscript StartImaging.vbs @VERSION@</action>
</step>
<step type="SMS_TaskSequence_RunCommandLineAction" name="Unified Logger Line" description="" disable="false" continueOnError="true" startIn="C:\AxedaConnectorScripts" successCodeList="0 3010" runIn="WinPEandFullOS">
<defaultVarList>
<variable name="PackageID" property="PackageID"></variable>
<variable name="RunAsUser" property="RunAsUser">false</variable>
<variable name="SMSTSRunCommandLineUserName" property="SMSTSRunCommandLineUserName"></variable>
<variable name="SMSTSRunCommandLineUserPassword" property="SMSTSRunCommandLineUserPassword"></variable>
<variable name="LoadProfile" property="LoadProfile">false</variable>
</defaultVarList>
<action>C:\AxedaConnectorScripts\ATMLogger.exe /category:Build /action:ReImage /version:@VERSION@ /description:Begin ReImage / event:true</action>
</step>
<step type="BDD_Gather" name="Gather" description="" disable="false" continueOnError="false" runIn="WinPEandFullOS" successCodeList="0 3010">
<defaultVarList>
<variable name="GatherLocalOnly" property="GatherLocalOnly">true</variable>
<variable name="RulesFile" property="RulesFile"></variable>
</defaultVarList>
<action>cscript.exe "%SCRIPTROOT%\ZTIGather.wsf"</action>
</step>
```

FIG. 10
(PRIOR ART)

```xml
<?xml version="1.0" encoding="iso-8859-1"?>
<sequence version="3.00" name="Custom Task Sequence" description="Sample Custom Task Sequence">
<group expand="false" name="Initialize Environment" description="" disable="false" continueOnError="false">
<action />
<step type="SMS_TaskSequence_RunCommandLineAction" name="Log Next Step" description="Writes next execution step to log file" disable="false" continueOnError="true" startIn="c:\Staging\Scripts\BAC_Scripts" successCodeList="0" runIn="WinPEandFullOS">
<defaultVarList>
  <variable name="PackageID" property="PackageID" />
  <variable name="RunAsUser" property="RunAsUser">false</variable>
  <variable name="SMSTSRunCommandLineUserName" property="SMSTSRunCommandLineUserName" />
  <variable name="SMSTSRunCommandLineUserPassword" property="SMSTSRunCommandLineUserPassword" />
  <variable name="LoadProfile" property="LoadProfile">false</variable>
</defaultVarList>
<action>LogToInstallSummary.exe "001:Start Imaging"</action>          ⎯ 1102
</step>
<step type="SMS_TaskSequence_RunCommandLineAction" name="Start Imaging" description="Log file created to log reimage time and date. " disable="false" continueOnError="false" startIn="c:\Staging\Scripts\BAC_Scripts" successCodeList="0 3010" runIn="WinPEandFullOS">
<defaultVarList>
  <variable name="PackageID" property="PackageID"></variable>
  <variable name="RunAsUser" property="RunAsUser">false</variable>
  <variable name="SMSTSRunCommandLineUserName" property="SMSTSRunCommandLineUserName"></variable>
  <variable name="SMSTSRunCommandLineUserPassword" property="SMSTSRunCommandLineUserPassword"></variable>
  <variable name="LoadProfile" property="LoadProfile">false</variable>
</defaultVarList>
<action>wscript StartImaging.vbs @VERSION@</action>
</step>
<step type="SMS_TaskSequence_RunCommandLineAction" name="Log Next Step" description="Writes next execution step to log file" disable="false" continueOnError="true" startIn="c:\Staging\Scripts\BAC_Scripts" successCodeList="0" runIn="WinPEandFullOS">
<defaultVarList>
  <variable name="PackageID" property="PackageID" />
  <variable name="RunAsUser" property="RunAsUser">false</variable>
  <variable name="SMSTSRunCommandLineUserName" property="SMSTSRunCommandLineUserName" />
  <variable name="SMSTSRunCommandLineUserPassword" property="SMSTSRunCommandLineUserPassword" />
  <variable name="LoadProfile" property="LoadProfile">false</variable>
</defaultVarList>
<action>LogToInstallSummary.exe "002:Unified Logger Line"</action>          ⎯ 1104
</step>
```

FIG. 11

001:Start Imaging
002:Unified Logger Line
003:Gather
004:Set VENDOR Variable to NCR
006:Set Simulator variable to FALSE
010:Set SkipFinalSummary Variable to YES
011:Set OSDisk Variable to C:
012:Capture Network Settings
013:Set PHASE Variable to STATERESTORE
015:Set Diebold Platform to Opteva
029:Gather
030:Clean Hard Drive
031:Apply Wim Image to the hard drive
033:Ensure OSDisk is using bootmgr not ntldr
034:Cleanup BCD
035:Configure BCD
036:Create Scratch Space for DISM
037:Configure Machine Name
038:Create C:\Windows\Panther
039:Copy Unattend.xml to C:\Windows\Panther
040:Apply Unattend.xml using DISM
048:Restart computer
049:Set Power Management Profile
050:Enhanced UEH Logging
051:Disable Hibernation
052:Unified Logger Line
053:Create Logs Directory
054:Gather
055:Apply Network Settings
056:Add C:\Phoenix\Bin to the Path
057:Enable Opteview CLEAN Project
058:Unified Logger Line
059:Unified Logger Line

FIG. 12

```xml
<?xml version="1.0" encoding="utf-8"?>

<configuration>
  <ReportingEnabled>true</ReportingEnabled>
  <ReportingLevel>info</ReportingLevel>
  <ReportingHost>https://web.bank.com</ReportingHost>
  <ReportingPort>490</ReportingPort>
  <ReportingEndpoint>Web/rest/deploylogentries</ReportingEndpoint>

<RecoveryActions MaxAttempts="3" AttemptsRemaining="2" AttemptsRemainingResetPattern="Finished Imaging">
    <Action NextStepPattern="Restart computer RA1" TimeoutSeconds="600" Action="Restart" />
  </RecoveryActions>

</configuration>
```

FIG. 14

The Stall Notification will consist of the
following detail in JSON format:

Terminal: ${TerminalID}
Type:"InstallationStall"
Task Sequence Step: ${CurrentStep}

FIG. 16

AUTOMATED TELLER MACHINE ("ATM") SOFTWARE RECOVERY

FIELD OF TECHNOLOGY

This invention relates to automated teller machine ("ATM") software. Specifically, this invention relates to recovery software in ATM update data.

BACKGROUND OF THE DISCLOSURE

In networked ATM environments, there may be a need for communication between ATM terminals and at least one network hub. Sometimes, the communications may be wireless. Other times, the communications may be wired.

The network hub may transmit data to the ATM terminals. The data may be transmitted in the form of executable code. The executable code may be executed on each of the ATM terminals. Failures may occur during the execution of the code on one or more ATM terminals. When code is being deployed for execution on thousands of ATMs distributed nationally and internationally there may be many reasons and/or causes for different aspects of the data transmission and deployment process to fail.

Conventionally, when an ATM experienced an executable code deployment failure, a technician or remote technician was required to manually repair the code deployment process.

At least in order to conserve time and resources, it would be desirable for the code deployment process to include a self-recovery system that would minimize the need for a manual repair of the ATM terminal software.

SUMMARY OF THE DISCLOSURE

Methods and apparatus for recovery software in ATM update data are provided. The recovery software may be utilized during a remote robotic installation of a software update.

In some embodiments, the recovery software or functionality may be embodied in a configuration file.

Methods, according to certain embodiments, may include receiving a compressed software stack at an ATM. The software stack may include compressed software files and programs. The software files and programs may be capable of updating the current ATM software. The software files and programs may include instructions for updating the current ATM software.

It should be appreciated that, for the purposes of this application, a software stack may be understood to be the layering of software components on an ATM. The software stack may include one or more operating systems, security patches, XFS device control code, terminal application software, end point security code, software distribution code and monitoring code.

The software stack may include a plurality of layers. In some embodiments, the software stack may include thousands of layers. The layers may include a windows operating system ("OS") layer, a device control layer and a user interface ("UI") layer. After the entire software stack is installed on the ATM, there may be 60,000 or more files present on the ATM terminal. Each layer may include multiple files.

Methods according to certain embodiments may include saving the compressed software stack on a preferably local ATM hard drive. The compressed software stack may preferably be saved in an inert state. Storing the software stack in an inert state may enable the ATM to continue operating in an uninterrupted fashion until the software stack is decompressed, or unpacked, and deployed.

Methods may also include obtaining, at a remote location, unimpeded control of the ATM. Unimpeded control may be understood, for the purposes of this application, to mean that no user can use the ATM—e.g., a customer cannot retrieve money/information from the ATM, bank personnel cannot obtain money/information from the ATM—and no servicer can service the ATM—e.g., a technician cannot access the ATM, a cash replenishment service cannot replenish cash at the ATM, a check retrieval service cannot retrieve checks from the ATM and a paper replenishment service cannot replace paper at the ATM—i.e., the ATM is substantially completely locked down.

Methods, according to certain embodiments, may also include booting the ATM into a windows pre-installation ("PE") operating system. The booting may be from a random access memory ("RAM") or from any other suitable memory preferably local to the ATM.

Methods, according to certain embodiments, may include activating an update initiation engine. The update initiation engine may be configured to erase unnecessary files from the ATM hard drive. The update initiation engine may also be configured to explode the software stack into a plurality of files. The update initiation engine may be further configured to unpack and place the plurality of files in the desired locations on the ATM hard drive. The update initiation engine may be configured to implement, as needed, an entity security policy. The update initiation engine may be configured to implement a specific security, or other type of, policy associated with the ATM.

Methods, according to certain embodiments, may also include using the update initiation engine to perform a sequence of initiation steps included in an XML ("eXtensible Markup Language") file. The XML file may be included in the plurality of files of the software stack.

Methods, according to certain embodiments, may include writing, in response to receiving an instruction from the XML file, a log statement into a log file. The log file may be included in the plurality of files of the software stack.

Systems for use, according to certain embodiments, may include two services. One service may be a standalone web service. The standalone web service may monitor installation progression, look for stalls and initiate recovery actions when necessary. The standalone web service may also communicate installation status to a second service—i.e., a remote web service—that allows for remote monitoring of the installation process. The standalone web service may also be used to monitor the log file for new entries. The standalone web service may determine that a new entry was written into the log file more than a predetermined amount of time prior to a current time.

When a determination is made that the new entry was written into the log file more than a predetermined amount of time before the current time and that the most recent entry—i.e., the new entry—is not a final entry, methods, according to certain embodiments, may include identifying the aforementioned pattern of events as a midstream ATM stall.

Upon identification of a midstream ATM stall, methods may include comparing the new entry to a midstream ATM stall action table. The comparing may utilize a regular expression comparison algorithm. The comparing may also be done utilizing a string comparison algorithm, or any other suitable algorithm.

At times, the new entry (or most recent entry) is a final entry. This may indicate that the update process has completed and no new entries will be written into the log file. The final entry may also indicate that the update has been successfully completed.

Methods, according to certain embodiments, may include selecting a recovery action based on the comparing. Methods may further include performing the determined recovery action.

In embodiments where the recovery software is included in a configuration file, the configuration file may be used to perform a number of actions. The actions may include enabling or disabling web-based reporting. Web-based reporting may be a system for transmitting messages, via the internet, to an outside entity. The messages may inform the outside entity of events occurring inside the ATM terminal. The actions may also include specifying host, port and REST endpoint information to which reporting messages are sent. The actions may also include configuring recovery actions.

In some embodiments, the configuration file may include an autonomous recovery agent ("ARA"). The ARA may report build progression detail to a designated listener. The ARA may look for the configuration file in a designated file. In some embodiments, the designated file may be "C:\Staging\BuildMonitor\ARA.config".

The configuration file may include a plurality of configuration parameters. The plurality of configuration parameters may be divided into at least two groups of parameters. A first group of parameters may be related to web-based reporting (discussed above). A second group of parameters may be related to recovery actions.

The web-based reporting group may include a reporting enabled parameter. The reporting enabled parameter may be set to "true" if the web-based reporting is active. The reporting enabled parameter may be set to "false" if the web-based reporting is not active. In the event that the ARA attempts to locate a prior configuration file and cannot locate a prior configuration file, the reporting enabled parameter may be set to "false". When the parameter is set to "false", no outbound web calls may be made and no automatic recovery attempts may be initiated.

The web-based reporting group may also include a reporting level parameter. The reporting level parameter may be set to different levels. The levels may include a debug level, a default level and any other suitable level. When the reporting level parameter may be set to debug, a message may be sent to the external entity prior to execution of each step. When the reporting level parameter may be set to default, a message may be sent to the external entity only upon the occurrence of an ATM midstream stall or successful completion of an update.

The web-based reporting group may also include a reporting host parameter. The reporting host parameter may be a uniform resource identifier ("URI") of a notification endpoint, for example, "http://187.0.0.1".

The web-based reporting group may also include a reporting port parameter. The reporting port parameter may include a port number of the notification endpoint, for example, 7700.

The web-based reporting group may also include a reporting endpoint parameter. The reporting endpoint parameter may include a name of the notification endpoint.

The recovery action group of parameters may include a max attempts parameter. The max attempts parameter may include the maximum number of recovery attempts allowed to be performed on a specific ATM terminal.

The recovery action group may also include an attempts remaining parameter. The attempts remaining parameter may include a persistent count of attempts remaining. The attempts remaining parameter may be decremented after each recovery action is executed. The attempts remaining parameter may be re-written or over-written upon execution of each recovery action.

The recovery action group may also include an attempts remaining reset pattern parameter. The attempts remaining reset pattern parameter may be a configuration item that may be included in the ATM's persistent storage, e.g., (C:\Staging\ . . . ). The attempts remaining reset pattern parameter may not necessarily be distributed with each executed action.

The recovery actions group may include one or more subsets of groups of parameters. One subset may be an action group. The action group may include a next step pattern parameter. The next step pattern parameter may include a regular expression (regex) pattern. The regex pattern may be matched against the text of the next step.

The action group may also include a timeout seconds parameter. The timeout seconds parameter may be an amount of time. From the initiation of a step, an internal clock may begin. A recovery action may be initiated upon completion of the amount of time included in the timeout seconds parameter.

The action group may also include an action parameter. The action parameter may be a recovery action. An example of a recovery action may be restarting the ATM. Upon completion of execution of the action parameter, a reset attempts remaining method may be called. The reset attempts remaining method may decrement the attempts remaining parameter. The reset attempts remaining method may also write over (or write back) the decremented number to the configuration file being used.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 9 shows another illustrative XML file in accordance with principles of the invention;

FIG. 10 shows a prior art illustrative XML file;

FIG. 11 shows an illustrative XML file in accordance with principles of the invention;

FIG. 12 shows an illustrative log file in accordance with principles of the invention;

FIG. 14 shows an illustrative XML configuration file in accordance with principles of the invention;

FIG. 16 shows an illustrative JSON™ format of a stall notification in accordance with principles of the invention.

DETAILED DESCRIPTION OF THE DISCLOSURE

Figure 1:
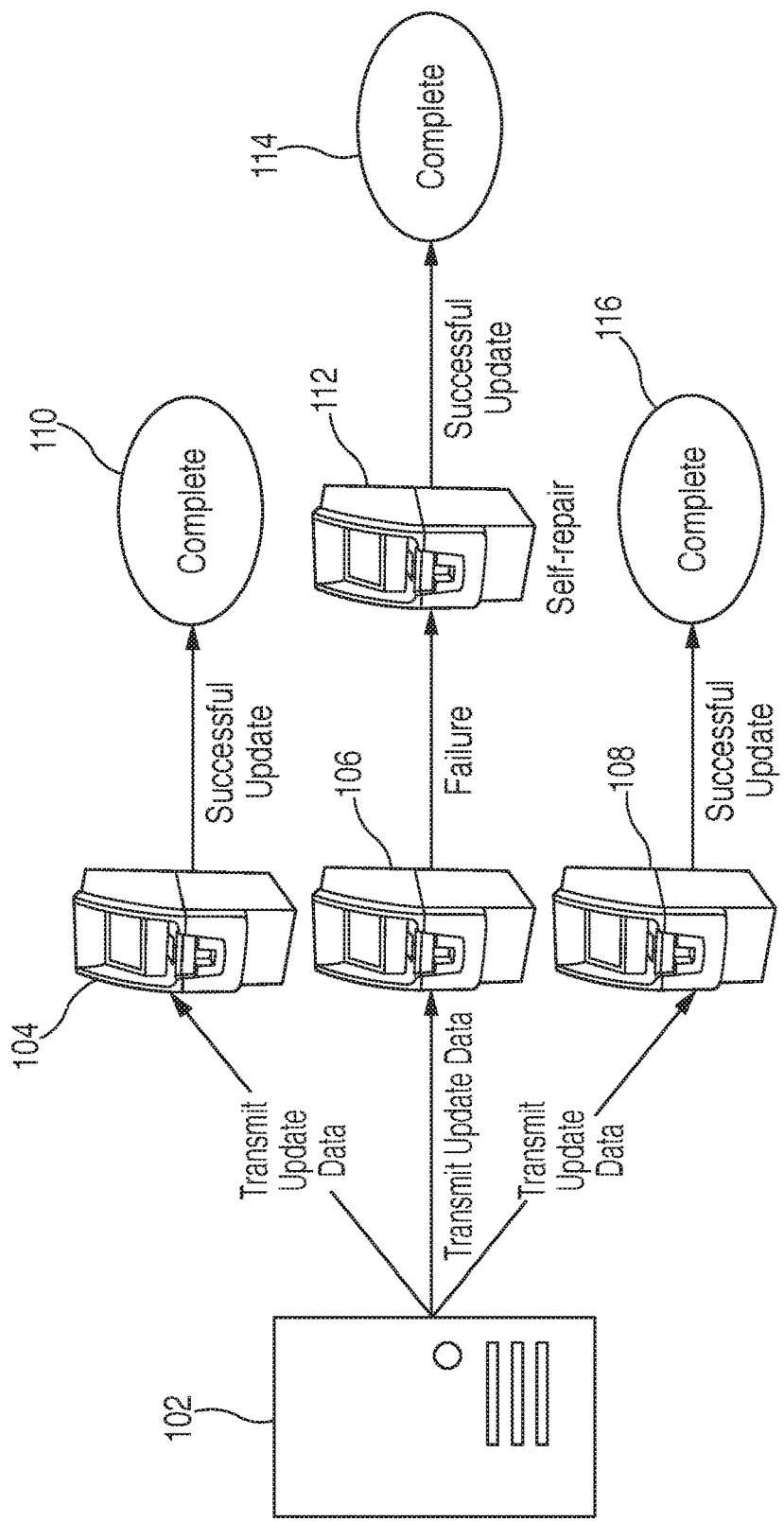
FIG. 1 shows an illustrative flow diagram in accordance with principles of the invention.

Aspects of the invention relate to software recovery at an ATM.

An apparatus for performing software recovery at an ATM are provided. The recovery may be initiated during a remote robotic installation of a software update. The apparatus may include a receiver. The receiver may be configured to receive a compressed software stack. The software stack may include a windows OS. The software stack may include any other suitable operating system, for example, Android™, Linux™, BlackBerry™, BSD™, Chrome OS™, iOS™, OS X™, QNX™, Steam OS™, μC/OS™, VxWorks™ and FreeRTOS™. An operating system may be a system software that controls both computer hardware and computer software resources. An operating system may also provide common services for computer programs.

The software stack may include a device control layer. The device control layer may include applications that manage various devices within the ATM. Examples of devices may include disk drives, printers, USB drives and any other suitable devices.

The software stack may include a UI layer. A UI layer may be application software that interacts with a user. Examples of UI software may be graphical user interfaces ("GUI") and command line interfaces. UIs may receive input from a user and transmit output to a user.

The apparatus may include a processor. The processor may be located at the ATM. In some embodiments, the processor may be remote to the ATM. In other embodiments, there may be a processor local to the ATM and a processor remote from the ATM.

The processor may be configured to store the compressed software stack in an inert state on the ATM hard drive. Upon obtaining unimpeded control of the ATM, the processor may also be configured to boot the ATM into a windows pre-installation ("PE") environment. In some embodiments, the windows PE environment may be included in the software stack. The system may boot into Windows PE from a random access memory ("RAM"). The system may boot into any other suitable operating system environment from any other suitable memory. The memory may be local to the ATM. The memory may be remote from the ATM. The processor may also be configured to activate an update initiation engine.

The update initiation engine may be configured to erase unnecessary files from the ATM hard drive. Erasing unnecessary files may free memory locations on the ATM hard drive. Files in the software stack may be expanded and placed in the free memory locations on the ATM hard drive.

At times, the names of the files included in the software stack may be the same names of files previously stored on the ATM hard drive. Erasing unnecessary files prior to unpacking the software stack may ensure that crosstalk does not occur between the older software files and the most recent software files.

The update initiation engine may be configured to explode the software stack into a plurality of files. Exploding the software stack may be understood to be unzipping or decompressing the files within the software stack.

The update initiation engine may be configured to unpack and place the plurality of files in the desired location on the hard drive. In some embodiments, the desired location for each file may be written in the file itself. In other embodiments, the desired location for each file may be written in metadata of each file. In yet other embodiments, the desired location for each file may be written in a table designating files and hardware locations. The locations may be virtual memory locations. The locations may be physical memory locations. The locations may be a combination of both virtual and physical memory locations.

The update initiation engine may be configured to implement an entity security policy. The update initiation engine may also be configured to implement a specific policy associated with the ATM.

The processor may be configured to perform a sequence of initiation steps included in an XML file. The XML file may be included in the plurality of files. The initiation steps may include setting configuration settings, executing applications and any other suitable initiation steps. In some embodiments, the XML file may execute the initiation steps. In other embodiments, an executable program or processor may execute the steps defined in the XML file.

Before each execution step included in the XML file, there may be a log statement. The processor may be configured to write the log statement to a log file prior to initiation of the following execution step. In this way, each line in the log file may declare what the next intended step is prior to its execution. In this way, if the execution fails on a particular step, the intended step, or behavior, has already been declared in the log file. Because the intended behavior has already been declared in the log file, it is not necessary to cross-reference the log statement against an external table to understand which step is producing the failure. Rather, the last step written in the log file is the step producing the failure. The log file may indicate which steps in the update process have been completed and which steps have not yet been completed. The log file may be included in the plurality of files.

The apparatus may include, or be configured to access, a standalone windows service. The windows service may be configured to monitor the log file for entries. The windows service may determine that a new entry was written into the log file more than a predetermined amount of time prior to a current time. The predetermined amount of time may be 0.5 milliseconds, 3 nanoseconds, 50 seconds, 25 minutes, 30 minutes, 7 hours, 4 days or any other suitable amount of time.

Once the windows service determines that A) a new entry was written into the log file more than a predetermined amount of time prior to a current time and B) that the new entry is not a final entry, the windows service may detect the occurrence of a midstream ATM stall. A midstream ATM stall may be understood to be an unexpected break in the installation process.

An internal recovery system may be launched upon the detection of a midstream ATM stall. The recovery system (discussed above) or configuration file may be initiated by the standalone windows service, the processor, a remote processor or any other suitable processing component.

The internal recovery system may be configured to compare the new entry to a midstream ATM stall action table. The midstream ATM stall action table may be included in the plurality of files. The midstream ATM stall action table may include a plurality of sample log files and corresponding recovery actions to the log files. The table may indicate what recovery action to perform according to the most recent log file entry. The recovery action can appropriately resolve the issue because the most recent log file entry may, in some embodiments, indicate relatively what percentage of the installation process was completed.

In some embodiments, the midstream ATM stall action table may also indicate a remediation action. The midstream ATM stall action table may also indicate an expected remediation time. The expected remediation time may enable the system to monitor itself based on the actual remediation time. The midstream ATM stall action table may also indicate expected required resources for each remediation action.

The comparison may be accomplished utilizing a regular expression matching algorithm. A regular expression matching algorithm may use a sequence of characters that define a search pattern in order to retrieve matching expressions. For example, a regular expression may accept any string as matching that includes six spaces following the letters "THE". The log file entries that correspond to this expression may include "THE little black dog", "IS YOUR NAME THE RESA" and "PLEASE TAKE HER TO BATHE, OK". This may be because each of these sentences include the letters "THE" followed by six spaces. Any other sequence of white spaces, characters, letters, numbers and special characters may be alternatively used to construct a regular expression.

In some embodiments, string matching, where one string is compared to a base string, may also be used.

Based on results obtained from the comparing, the processor may determine a recovery action. The recovery action may preferably be initiated to rectify the midstream ATM stall.

The processor may perform the recovery action. The recovery action may include reactivating the update initiation engine. The recovery action may include rebooting the ATM. The recovery action may include restarting the installation process.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow diagram in accordance with principles of the invention. Server 102 may transmit update data to ATMs 104, 106 and 108. ATMs 104, 106 and 108 may receive the update data. Based on the received data, ATM 104 may execute a completely successful update, as shown at 110.

ATM 106 may also receive the update data. ATM 106 may attempt to execute the update data. The installation process on ATM 106 may fail. The update data may include methods for self-repair. The ATM may execute the self-repair routine, as shown at 112. Upon completion of the self-repair routine the update may successfully complete, as shown at 114.

ATM 108 may also receive update data. ATM 108 may attempt to execute the update data. The update may be successfully completed, as shown at 116.

Figure 2:
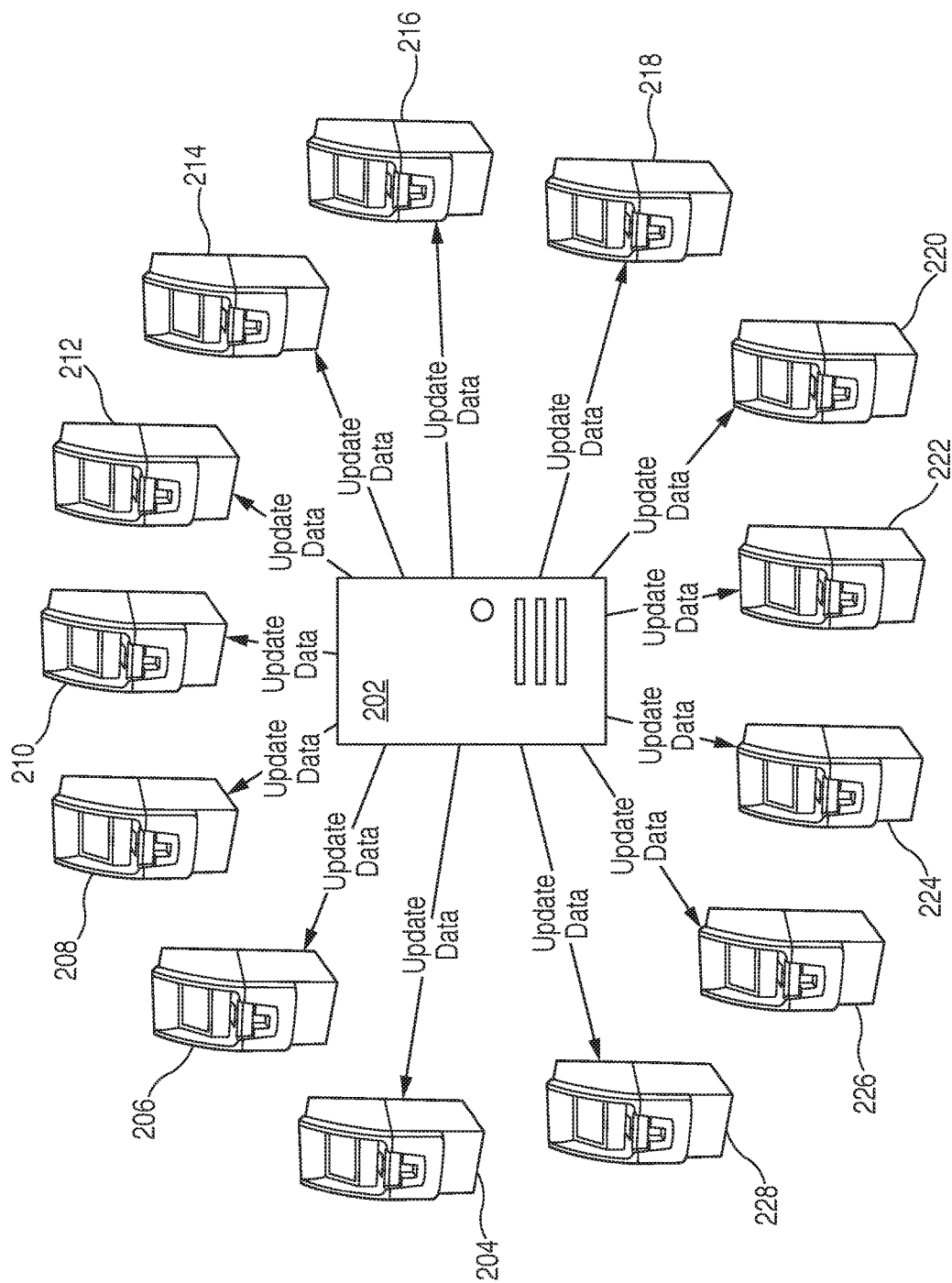
FIG. 2 shows another illustrative flow diagram in accordance with principles of the invention.

FIG. 2 shows an illustrative flow diagram in accordance with principles of the invention. Server 202 may transmit update data to ATMs 204-228. ATMs 204-228 may receive the update data. ATMs 204-228 may maintain the update data in an inert state until further instructions are received from server 202. At times, ATMs 204-228 may maintain the update data in an inert state until a specific date time value, or specific offset amount of time. The date time value or offset amount of time may be included in the update data.

An offset amount of time may be a specific amount of time which is offset from an incident. For example, an offset amount may be 15 hours from receipt of the update software. Another example of an offset amount may be 5, 10, 15 or 20 minutes from a designated occurrence.

Upon instruction, ATMs 204-228 may initiate the installation process. During the installation process, a number of ATMs may experience failures.

Figure 3:
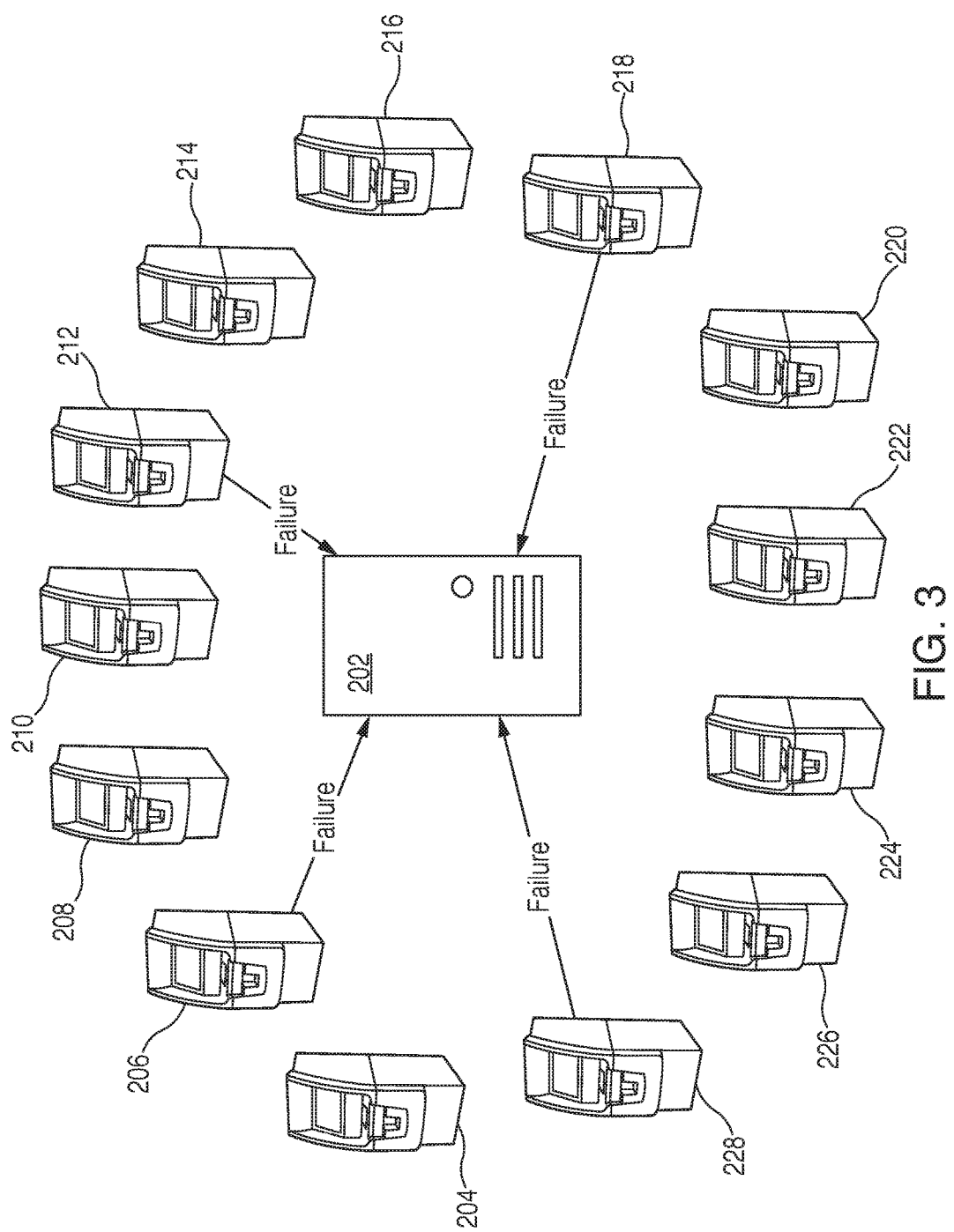
FIG. 3 shows yet another illustrative flow diagram in accordance with principles of the invention.

FIG. 3 shows server 202 and ATMs 204-228 after ATMs 206, 212, 218 and 228 experienced failures. ATMs 206, 212, 218 and 228 may transmit failure messages to server 202.

Figure 4:
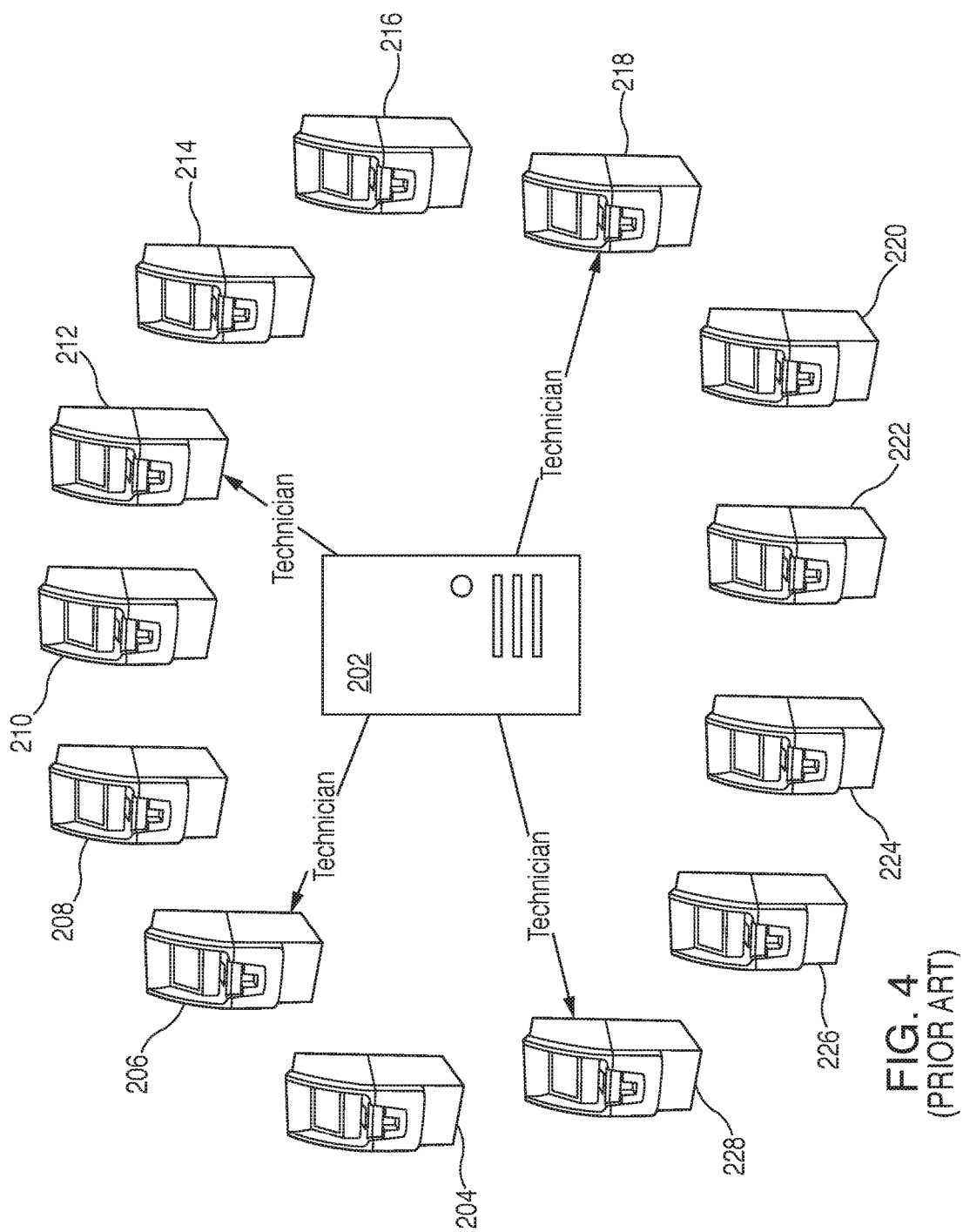
FIG. 4 shows a prior art illustrative flow diagram.

FIG. 4 shows a prior art scenario when server 202 receives failure messages from ATMs 206, 212, 218 and 228. Server 202 may transmit a message to a ticketing system. The ticketing system may transmit a message to one or more physical technicians. The one or more physical technicians may drive to ATMs 206, 212, 218 and 228 to repair the ATMs manually. In some embodiments, the ticketing system may transmit a message to a remote technician. The remote technician may repair ATMs 206, 212, 218 and 228 using remote technology. Manual and remote technicians may be costly and not always available.

Figure 5:
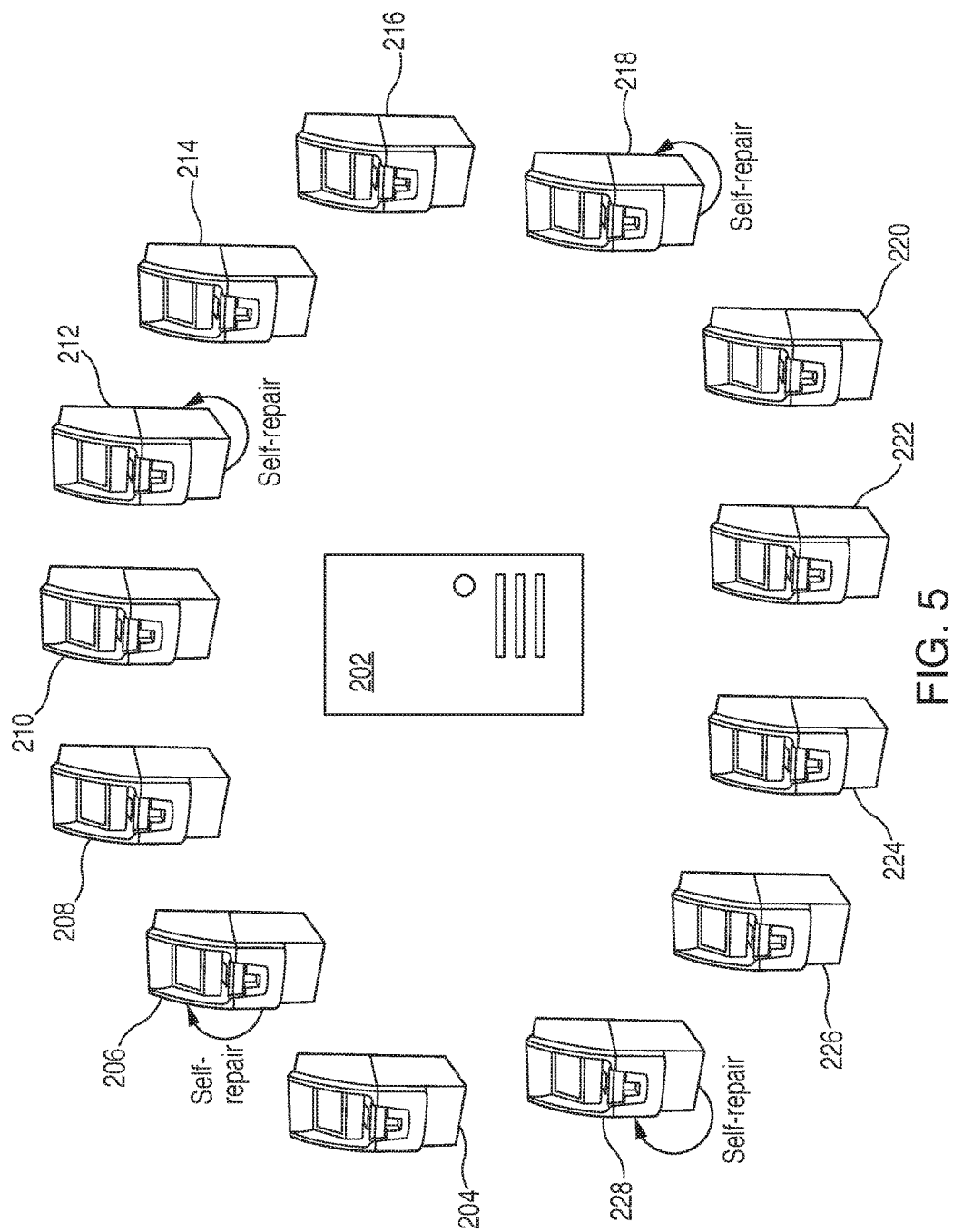
FIG. 5 shows an illustrative flow diagram in accordance with principles of the invention.

FIG. 5 shows server 202 and ATMs 206, 212, 218 and 228 utilizing the methods described herein. ATMs 206, 212, 218 and 228 may experience failures and transmit failure messages to server 202, as described in FIG. 3. Utilizing self-repair software included in the update data, ATMs 206, 212, 218 and 228 may perform a self-repair procedure. The self-repair procedure may enable ATMs 206, 212, 218 and 228 to recover from their respective software failures. ATMs 206, 212, 218 and 228 may then successfully complete the installation process, thereby not requiring assistance from a physical technician or remote technician. In some embodiments, the failures may be related to networking features of ATMs 206, 212, 218 and 228. In these embodiments, ATMs 206, 212, 218 and 228 may attempt self-repair prior to transmitting a message to server 202 because of their lack of connectivity, or ability to transmit messages.

Figure 6:
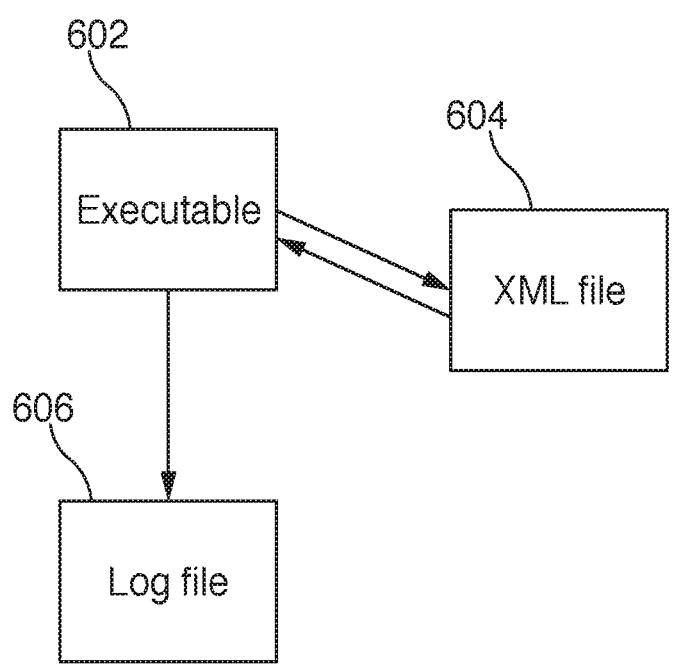
FIG. 6 shows an illustrative flow diagram in accordance with principles of the invention.

FIG. 6 shows executable program 602 reading XML file 604. Prior to initiation of each step included in XML file 604, executable program 602 may write a log entry to log file 606. The writing to the log file may be written as a result of an instruction read from XML file 604.

Figures 7, 8:
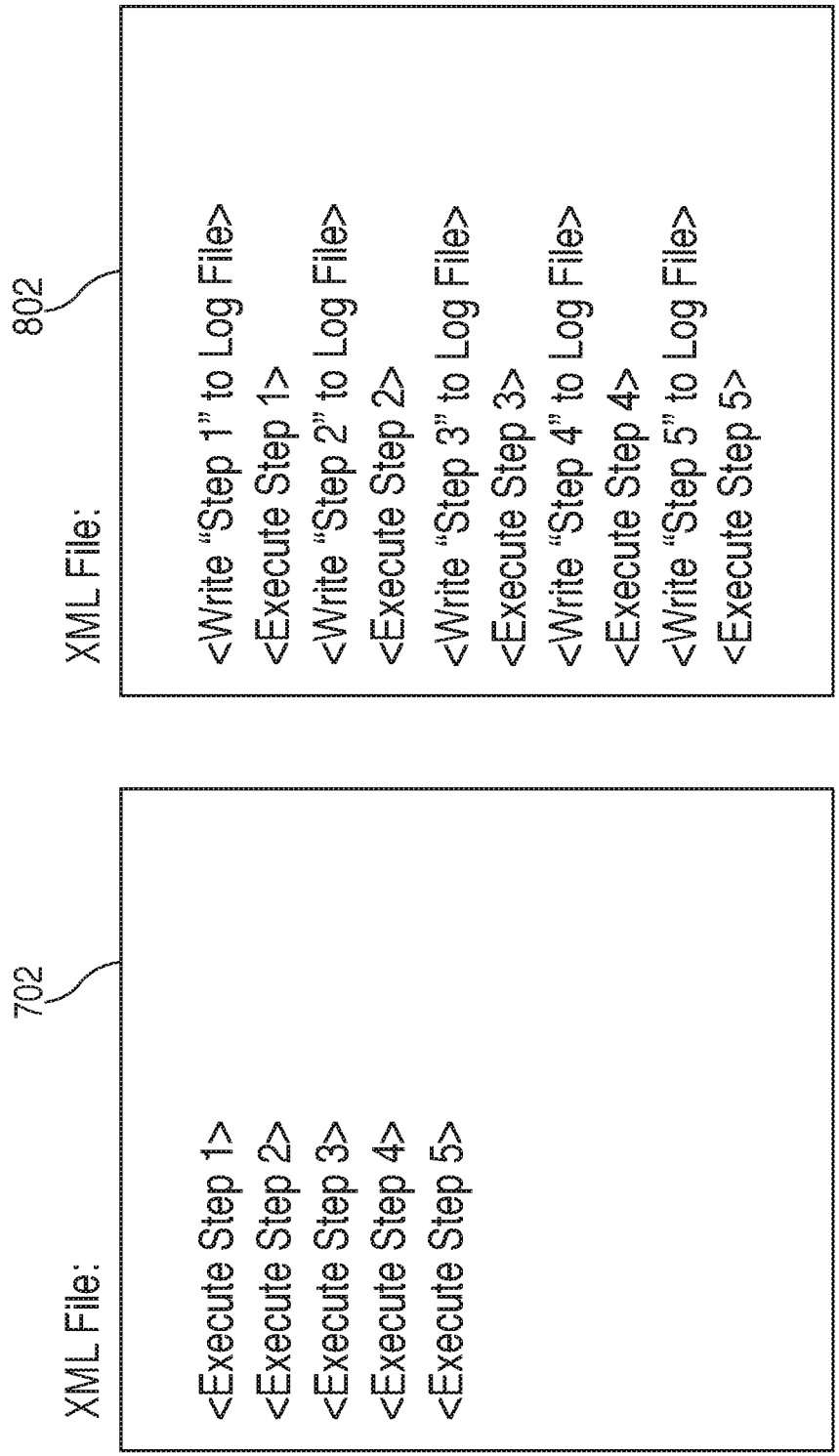
FIG. 7 shows a prior art illustrative XML file.
FIG. 8 shows an illustrative XML file in accordance with principles of the invention.

FIG. 7 shows a prior art XML file 702. XML file 702 include instructions to execute steps 1-5. It may be difficult to discern which steps were accomplished during an installation process because there is no record of which steps were executed and which were not executed.

FIG. 8 shows XML file 802. XML file 902 may include instructions to execute steps 1-5. Prior to the execution of each instruction, the XML file may instruct the executable to write the step number to a log file. This may enable a user or system to discern which steps were accomplished and which steps have not yet been accomplished.

FIG. 9 shows XML file 902. XML file 902 may include instructions to execute steps 1-5. Prior to the execution of each instruction, the XML file may instruct the executable to write a string, for example, "The Activity will be accomplished", "Bob will complete Step 4" and "Hardware element 634dkj3 will complete step 5". In certain embodiments, there may be fields within the write commands that are dynamic—i.e., changeable based on what has occurred or what is intended to occur. Dynamic fields may assist a user or system to know which engine accomplished which job and which hardware element did not complete which job.

FIG. 10 shows an illustrative prior art XML file. It should be appreciated that there are no log statements prior to each step.

FIG. 11 shows an illustrative XML file according to certain embodiments. Line 1102 shows an executable called "LogtoInstallSummary.exe" which instructs the system to write a log statement to a log file. Line 1102 also shows the log statement—"001:Start Imaging" which may be written to the log file. It should be appreciated that the log statement is written to the log file prior to execution of the "start imaging action".

Line 1104 also shows an instruction to write a log statement to a log file. It should be appreciated that the same executable is called in both lines 1104 and 1102 in order that the log statements should all appear in one file.

FIG. 12 shows an illustrative log file produced from the XML file shown in FIG. 11. The log statements shown in lines 1102 and 1104 have been placed in boxes for clarity.

Figure 13A:
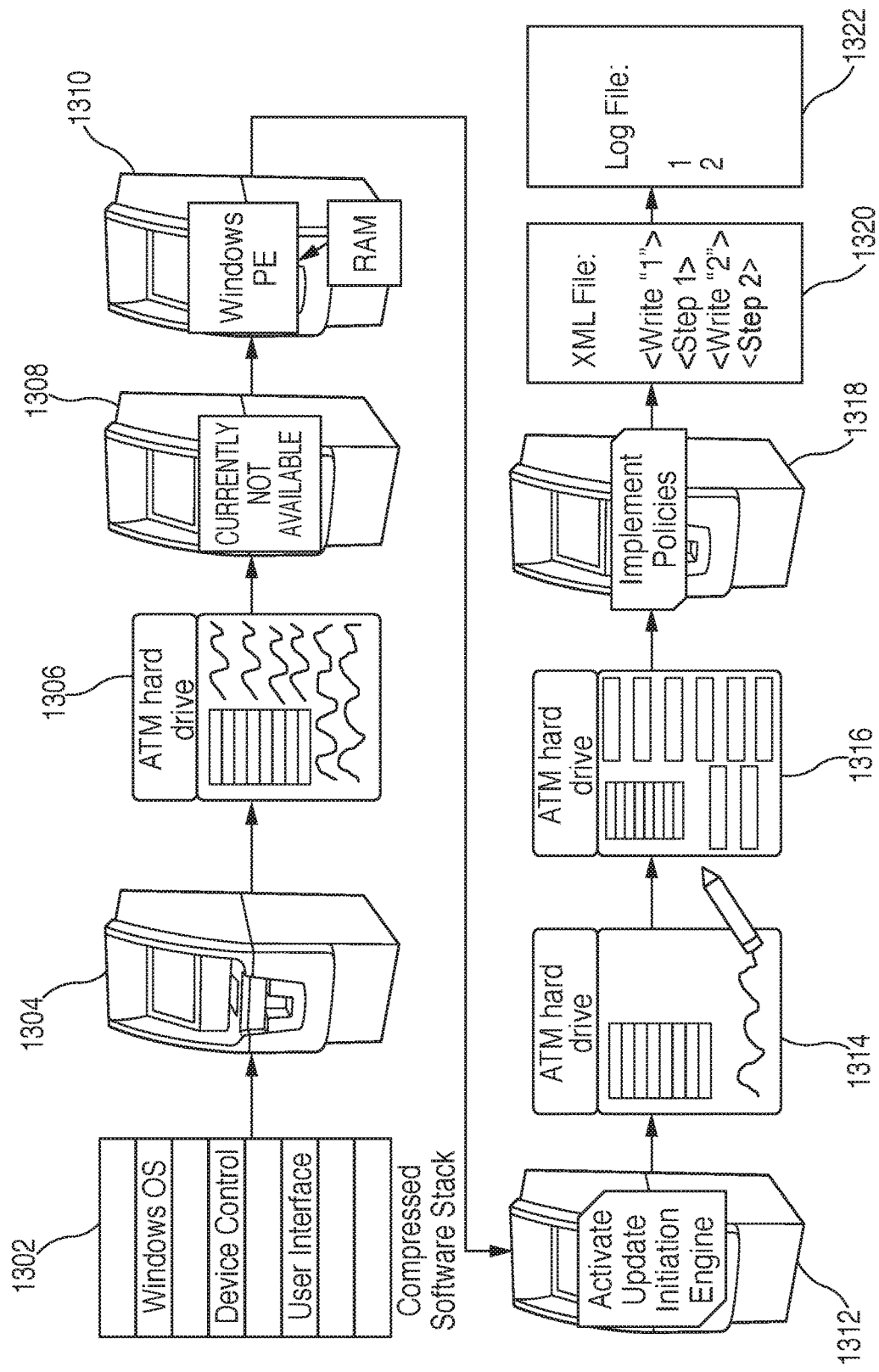
FIGS. 13A-B show an illustrative hybrid diagram/flow diagram in accordance with principles of the invention.
Figure 13B:
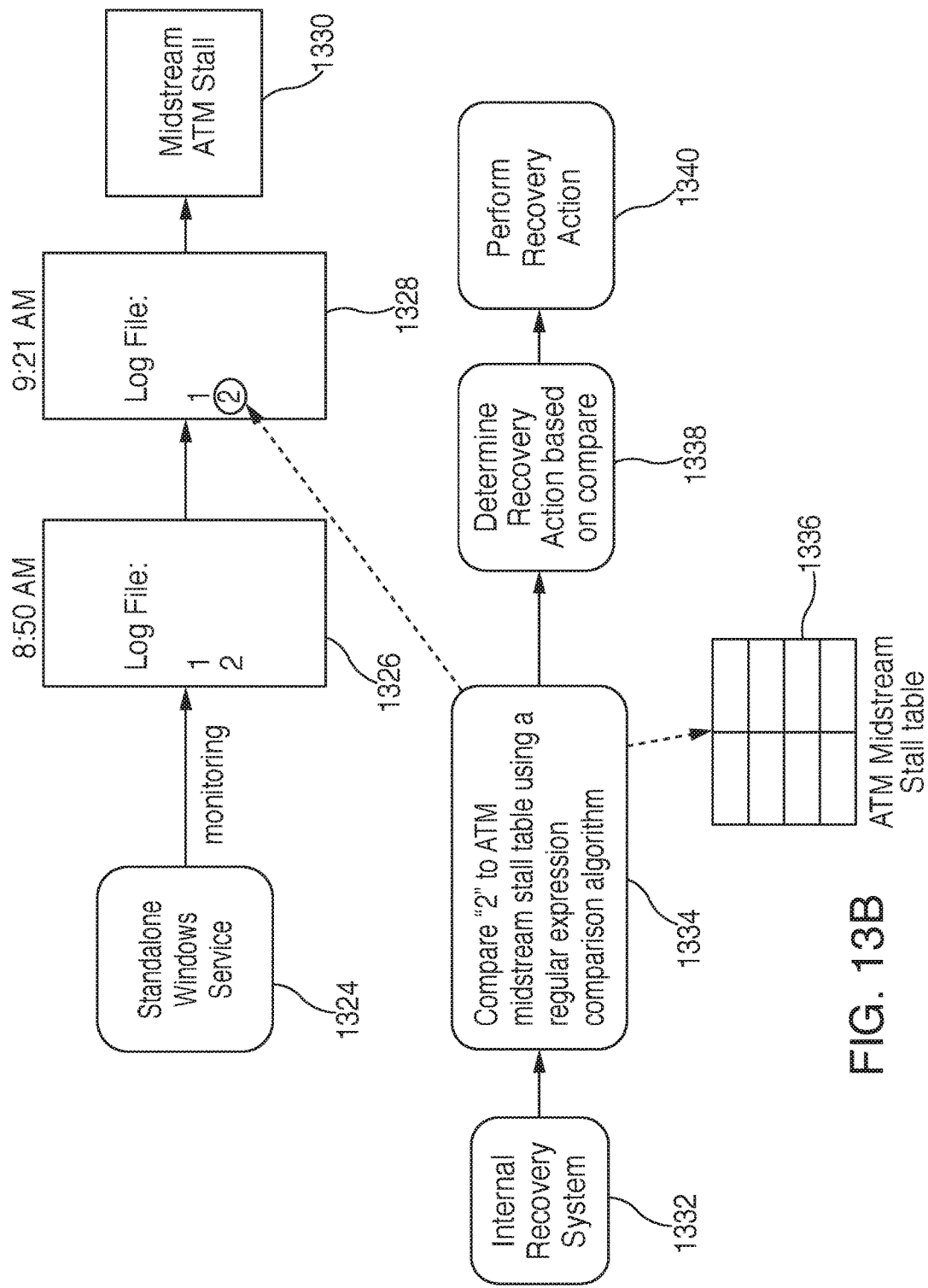

FIGS. 13A-B shows an illustrative hybrid diagram/flow chart in accordance with principles of the invention. Step 1302 shows a compressed software stack. Included in the compressed software stack is a windows OS, a device control and a user interface.

Step 1304 shows that the compressed software stack is transmitted to an ATM. Step 1306 shows storing the compressed software stack on the ATM's hard drive. Step 1308 shows obtaining unimpeded control of the ATM. Obtaining unimpeded control of the ATM may include displaying a screen informing that the ATM is currently unavailable. Obtaining unimpeded control of the ATM may also include transmitting a message to ATM servicers that the ATM is currently unavailable for servicing. Obtaining unimpeded control of the ATM may also include disabling the ATM display screen. Obtaining unimpeded control of the ATM may also include locking components of the ATM to ensure that a servicer does not tamper with the components.

Step 1310 includes booting the ATM into Windows PE from RAM. Step 1312 shows activating an update initiation engine. The update initiation engine may erase old or unnecessary files from the hard drive, as shown at step 1314.

Step 1316 shows unpacking the files from the software stack into the ATM hard drive. Step 1318 shows the update initiation engine implementing policies on the ATM. The policies may be specific to the ATM. The policies may be specific to the region, e.g., city, state, county or zip code. Steps 1320 and 1322 shows the XML file and the log file. Prior to execution of step 1 by the XML file, the XML file instructs "1" to be written to the log file. Prior to execution of step 2 by the XML file, the XML file instructs "2" to be written to the log file.

Step 1324 shows a standalone windows service. The standalone windows service may monitor the log file for new entries, as shown at 1326. At 8:50 AM, the windows service may detect a new entry—"2". At 9:21 AM, more than thirty minutes after "2" was written into the log file, the log file does not contain any more entries, as shown at 1328. Because "2" is not a final entry—i.e., the last entry in the installation process, a midstream ATM stall is defined, as shown at 1330.

An internal recovery system is launched, as shown at 1332. The internal recovery system may compare the log entry—"2" to ATM midstream stall action table 1336, as shown at 1334. The comparison may be implemented via a regular expression comparison algorithm or any other suitable algorithm.

A recovery action may be determined based on the comparison, as shown at 1338. The internal recovery system may perform the determined recovery action, as shown at 1340.

FIG. 14 shows an illustrative configuration XML file. In the configuration file, the reporting enabled parameter may be set to true. The reporting level parameter may be set to info. The reporting host parameter may be set to https://web.bank.com. The reporting port parameter may be set to 490. The reporting endpoint parameter may be set to "Web/rest/deploylogentries". The recovery actions max attempts parameter may be set to 3. The attempts remaining parameter may be set to 2. The attempts remaining reset pattern may be set to "finished imaging". The action next step pattern parameter may be set to "restart computer RA1". The timeout seconds parameter may be set to 600. The action parameter may be set to "restart".

Figure 15:
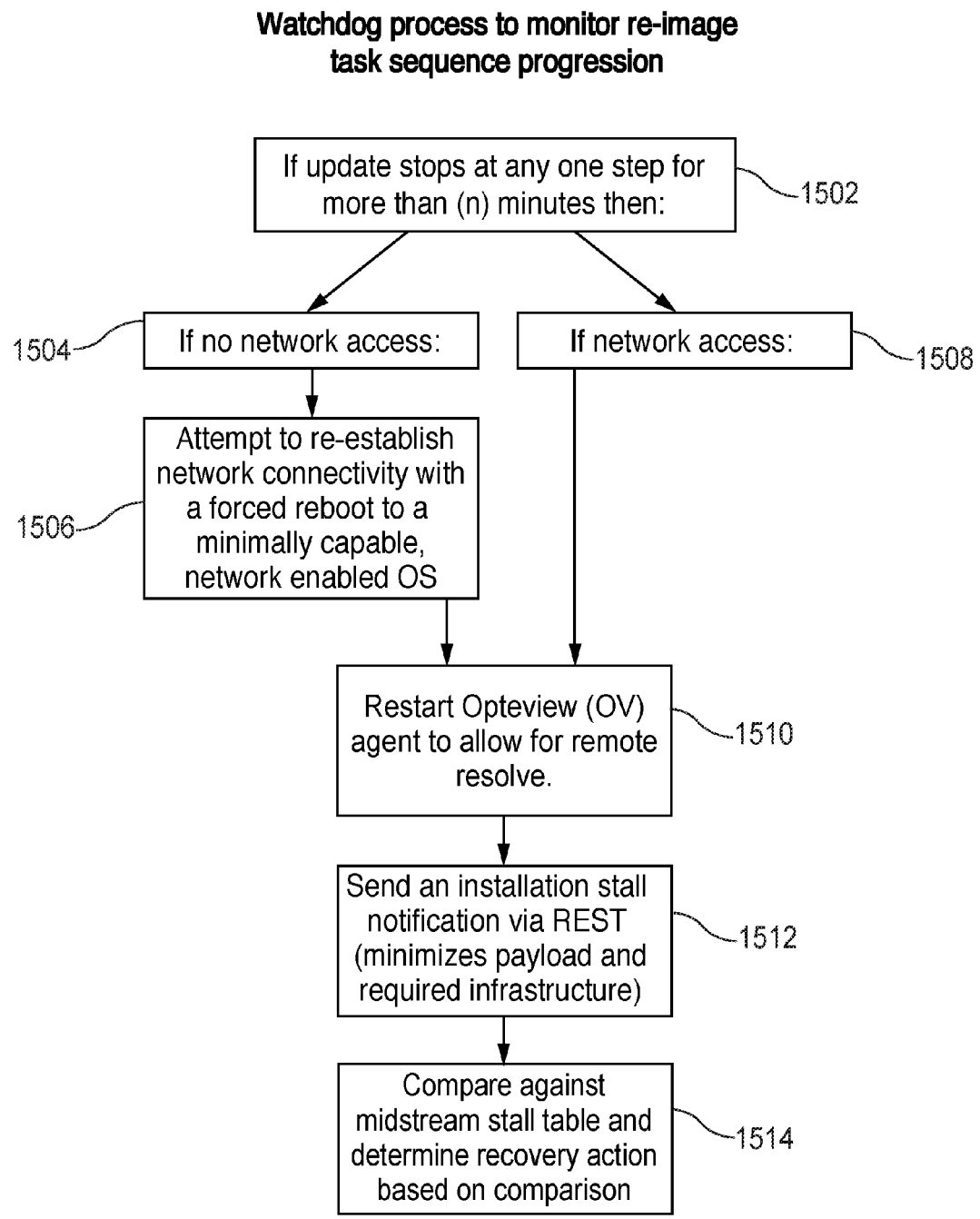
FIG. 15 an illustrative flow chart in accordance with principles of the invention.

FIG. 15 shows an illustrative flow chart. The illustrative flow chart may show a watchdog process that monitors re-image task sequence progression. Step 1502 shows the update stopped at any one step for more than (n) minutes.

If there is network access, the process proceeds to step 1510, as directed by 1508.

If there is no network access, the process proceeds to step 1506, as directed by 1504. Step 1506 shows attempting to re-establish network connectivity with a forced reboot to a minimally capable, network enabled OS.

Step 1510 shows restarting opteview (OV) agent to allow for remote resolve.

Step 1512 shows sending an installation stall notification via REST to an entity. The transmission of an installation stall notification message via REST protocol may minimize payload and required infrastructure to perform the update remediation.

Step 1514 shows comparing the most recent log entry against a midstream stall table. Step 1514 also shows determining a recovery action based on the comparing.

FIG. 16 shows an illustrative JSON format of a stall notification. The stall notification may include terminal identification information. The stall notification may also include stall type information. The stall notification may also include task sequence step information—i.e., what step the update is stalled at.

Thus, methods and apparatus for an ATM software recovery system have been provided. Persons skilled in the art will appreciate that the present invention can be practiced by other than the described embodiments, which are presented for purposes of illustration rather than of limitation. The present invention is limited only by the claims that follow.

What is claimed is:

1. A method for performing software recovery at an automated teller machine ("ATM") during a remote robotic installation of a software update, the method comprising:
receiving a compressed software stack at the ATM, the software stack comprising three layers:
a windows operating system;
a device control layer; and
a user interface layer;
activating an update initiation engine, said update initiation engine configured to:
erase unnecessary files from the ATM hard drive;
explode the software stack into a plurality of files;
unpack and place the plurality of files in the desired locations on the hard drive;
implement an entity security policy; and
implement a specific policy associated with the ATM;
performing a sequence of initiation steps included in an XML file, said XML file included in the plurality of files;
upon completion of each initiation step, writing, as a result of an instruction from the XML file, a log statement into a log file included in the plurality of files;
upon determination that a new entry was written into the log file more than thirty minutes before a current time and that the new entry is not a final entry, defining a midstream ATM stall;
upon definition of a midstream ATM stall, launching an internal recovery system;
comparing, utilizing a regular expression comparison algorithm included in the internal recovery system, the new entry to a midstream ATM stall action table, and based on the comparing determining a recovery action to perform in order to rectify the midstream ATM stall; and
performing the determined recovery action.

2. The method of claim 1, wherein the determined recovery action comprises re activating the update initiation engine.

3. The method of claim 1, wherein the determined recovery action comprises rebooting the ATM.

4. The method of claim 1, wherein the obtaining unimpeded control of the ATM includes locking components of the ATM from a servicer.

5. The method of claim 1 further comprising saving the compressed software stack in an inert state on an ATM hard drive.

6. The method of claim 1, wherein, prior to activating the update initiation engine, the method comprises obtaining unimpeded control of the ATM.

7. The method of claim 1, wherein prior to activating the update initiation engine, the method comprises hooting the ATM into a windows pre-installation environment ("PE") operating system from a random access memory ("RAM") included in the ATM.

8. The method of claim 1, further comprising monitoring, by a standalone windows service, for new entries in the log file.

9. The method of claim 1, wherein the log statement is dynamically generated.

10. An apparatus for performing software recovery at an automated teller machine ("ATM") during a remote robotic installation of a software update, the apparatus comprising:
a receiver, at the ATM, configured to receive a compressed software stack, the software stack comprising:
a windows operating system;
a device control layer; and
a user interface layer;
a processor, at the ATM, configured to:
activate an update initiation engine;
the update initiation engine configured to:
erase unnecessary files from the ATM hard drive;
explode the software stack into a plurality of tiles;
unpack and place the plurality of files in the desired location on the hard drive;
implement an entity security policy; and
implement a specific policy associated with the ATM;
the processor further configured to:
perform a sequence of initiation steps included in an XML file, said XML file included in the plurality of files;
upon completion of each initiation step, write, as a result of an instruction included in the XML file, a log statement into a log file included in the plurality of files;
a standalone windows service configured to:
determine that a new entry was written into the log file more than thirty minutes prior to a current time;
determine that the new entry is not a final entry;
detect a midstream ATM stall; and
launch an internal recovery system;
the internal recovery system configured to:
compare, utilizing a regular expression comparison algorithm included in the internal recovery system, the new entry to a midstream ATM stall action table;
determine, based on the comparing, a recovery action to perform in order to rectify the midstream ATM stall; and
perform the determined recovery action.

11. The apparatus of claim 10, wherein the determined recovery action comprises re activating the update initiation engine.

12. The apparatus of claim 10, wherein the determined recovery action comprises rebooting the ATM.

13. The apparatus of claim 10, wherein the obtaining unimpeded control of the ATM includes locking components of the ATM from use by a servicer.

14. The apparatus of claim 10, wherein the processor is further configured to store the compressed software stack in an inert state on an ATM hard drive.

15. The apparatus of claim 10, wherein upon obtaining unimpeded control of the ATM, boot the ATM into a windows pre-installation environment ("PE") operating system from a random access memory ("RAM") included in the ATM.

16. The apparatus of claim 10, wherein the standalone web service is further configured to monitor the log file for new entries.

17. The apparatus of claim 10, wherein the entries written to the log file are dynamic.

* * * * *